(12) United States Patent
Gomes Martins et al.

(10) Patent No.: US 10,947,822 B2
(45) Date of Patent: Mar. 16, 2021

(54) MONOLITHIC MANIFOLD WITH EMBEDDED VALVES

(71) Applicant: FMC TECHNOLOGIES DO BRASIL LTDA, Rio de Janeiro (BR)

(72) Inventors: Luciano Gomes Martins, Duque de Caxias (BR); Paulo Augusto Couto Filho, Rio de Janeiro (BR); Alex Ceccon De Azevedo, São Goncalo (BR); Alan Zaragoza Labes, Rio de Janeiro (BR)

(73) Assignee: FMC TECHNOLOGIES DO BRASIL LTDA, Rio de Janeiro (BR)

( * ) Notice: Subject to any disclaimer, the term of this patent is extended or adjusted under 35 U.S.C. 154(b) by 0 days.

(21) Appl. No.: 15/512,221

(22) PCT Filed: Sep. 18, 2015

(86) PCT No.: PCT/BR2015/050158
§ 371 (c)(1),
(2) Date: Mar. 17, 2017

(87) PCT Pub. No.: WO2016/044910
PCT Pub. Date: Mar. 31, 2016

(65) Prior Publication Data
US 2017/0241243 A1  Aug. 24, 2017

(30) Foreign Application Priority Data

Sep. 25, 2014  (BR) .............................. 102014023895

(51) Int. Cl.
*E21B 43/01*  (2006.01)
*E21B 41/00*  (2006.01)
(Continued)

(52) U.S. Cl.
CPC ...... *E21B 43/0107* (2013.01); *E21B 41/0007* (2013.01); *E21B 43/01* (2013.01); *E21B 43/017* (2013.01); *F16K 3/0245* (2013.01)

(58) Field of Classification Search
CPC ...... E21B 43/0107; E21B 34/04; E21B 34/02; E21B 34/00; Y10T 137/87249;
(Continued)

(56) References Cited

U.S. PATENT DOCUMENTS 3,134,395 A * 5/1964 Glasgow .................. B67D 7/78
137/315.01
3,957,079 A  5/1976 Whiteman
(Continued)

FOREIGN PATENT DOCUMENTS

EP  0 429 411 A2  5/1991
WO  98/33990 A1  8/1998
(Continued)

OTHER PUBLICATIONS

International Search Report issued in PCT/BR2015/050158 dated Dec. 9, 2015 (3 pages).
(Continued)

*Primary Examiner* — Michael R Reid
(74) *Attorney, Agent, or Firm* — Osha Bergman Watanabe & Burton LLP (57) ABSTRACT

In one illustrative embodiment, the manifold comprises a block with at least one drilled header hole formed within the block, a plurality of drilled flow inlet holes formed within the block, wherein the number of drilled flow inlet holes corresponds to the number of the plurality of external flow lines that supply fluid (e.g., oil/gas) to the manifold and a plurality of isolation valves coupled to the block wherein the valve element for each of the isolation valves is positioned within the block.

23 Claims, 8 Drawing Sheets

(51) Int. Cl.
*E21B 43/017* (2006.01)
*F16K 3/02* (2006.01)

(58) Field of Classification Search
CPC ..... Y10T 137/87571; Y10T 137/87676; Y10T 137/87684
USPC ........ 166/373; 137/884, 269, 270, 271, 597, 137/602, 605, 606
See application file for complete search history.

(56) References Cited

U.S. PATENT DOCUMENTS

| | | | | |
|---|---|---|---|---|
| 4,091,840 | A * | 5/1978 | Grove | F16K 11/07 137/269 |
| 4,711,268 | A * | 12/1987 | Coleman | F16K 11/22 137/597 |
| 4,757,943 | A * | 7/1988 | Sperling | G05D 23/1393 137/601.14 |
| 5,277,224 | A * | 1/1994 | Hutton | F16K 11/22 137/552 |
| 5,832,956 | A * | 11/1998 | Nimberger | F16K 11/22 137/597 |
| 5,906,223 | A * | 5/1999 | Pinkham | F16K 11/22 137/597 |
| 5,967,188 | A * | 10/1999 | Chien-Chuan | F16K 27/003 137/861 |
| 6,293,305 | B1 * | 9/2001 | Soares | F16T 1/38 137/597 |
| 6,688,324 | B2 * | 2/2004 | Hoang | F16K 3/188 137/240 |
| 2005/0072481 | A1 * | 4/2005 | Hanada | F16K 27/003 137/884 |

FOREIGN PATENT DOCUMENTS

| | | |
|---|---|---|
| WO | 00/08297 A1 | 2/2000 |
| WO | 00/52370 A1 | 9/2000 |

OTHER PUBLICATIONS

Written Opinion of the International Searching Authority issued in PCT/BR2015/050158 dated Dec. 9, 2015 (6 pages).

* cited by examiner

MONOLITHIC MANIFOLD WITH EMBEDDED VALVES

FIELD OF INVENTION

The present invention relates to a manifold with unique block architecture that is designed to control the flow of fluids from various flow lines, which, for example, may be the flow of oil/gas from oil wells and to wells if the manifold is configured for injection.

BACKGROUND OF THE INVENTION

A traditional subsea manifold is a device that is designed to control the flow of fluids from oil wells and direct the flow through various production/injection loops that are made of piping, valves, connector hubs and fittings. A traditional subsea manifold also typically includes various flow meters and controls systems for monitoring the flow of the fluids and controlling various valves. The most common joining method for the piping, valves, hubs and fittings is by welding but bolted flange connections are also used.

The manifolds can be classified into: production (oil, gas or condensate), water injection, lift and mixed (production and water injection). They all have a similar basic structure. A typical subsea manifold has a main base which is a metal structure that supports all piping, hydraulic and electrical lines, production and crossover modules, import and export hubs and control modules of the subsea manifold.

Typically, to design a subsea manifold certain information is needed: a flowchart of fluid flow, the number of Christmas (wells) trees that will be linked, and possibly other platforms manifolds. In general, the flowchart of fluid flow is provided by the client. With the requirements of the system, it is possible to begin the process of designing the elaborate arrangement of pipes, valves and hubs that will be part of the subsea manifold. A typical subsea manifold also includes an arrangement of structural members, e.g., a support structure comprised of beams and cross members that are designed to facilitate the installation of the manifold, distribute external loading and also support the arrangement of pipes and other equipment or components of the subsea manifold.

Below is one example of a summary of the steps for preparing the design of the conventional subsea manifold.
1. Flowchart.
2. Prepare the design of the arrangement of pipes, valves and hubs.
3. Prepare the design of the metal support structure.

The conventional subsea manifold promotes the flow of fluid from the oil and gas wells in manner mandated by the fluid flowchart of the project, through a complex arrangement of numerous flow paths that are defined by welded pipes, pipe fittings, such as elbows and/or flanged connections. Valves are positioned within the pipe flow paths to control the flow of fluid and there is a requirement to open and close these valves at various times.

Figure 1A:
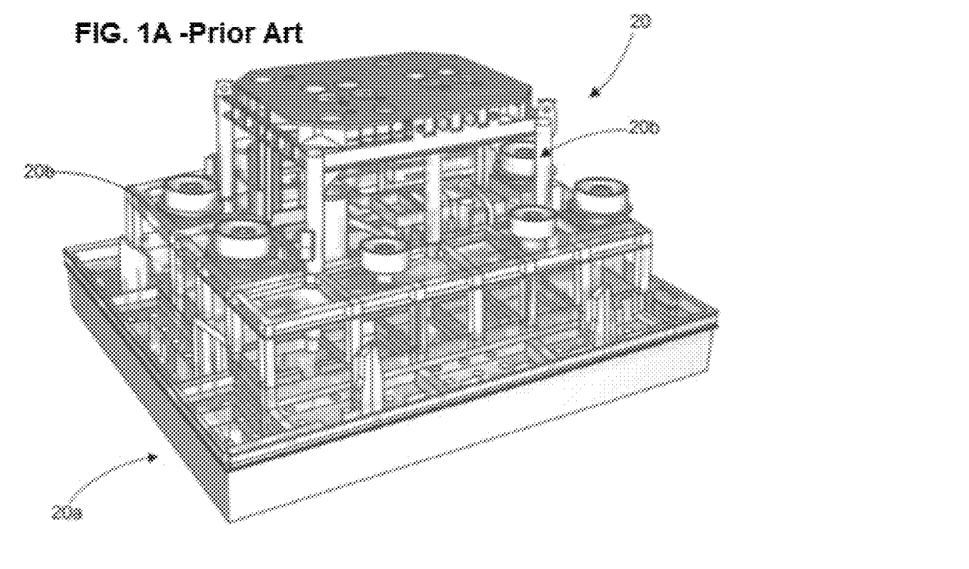
FIGS. 1(a)-(b) depict one illustrative example of a traditional subsea manifold according to the prior art.
Figure 1B:
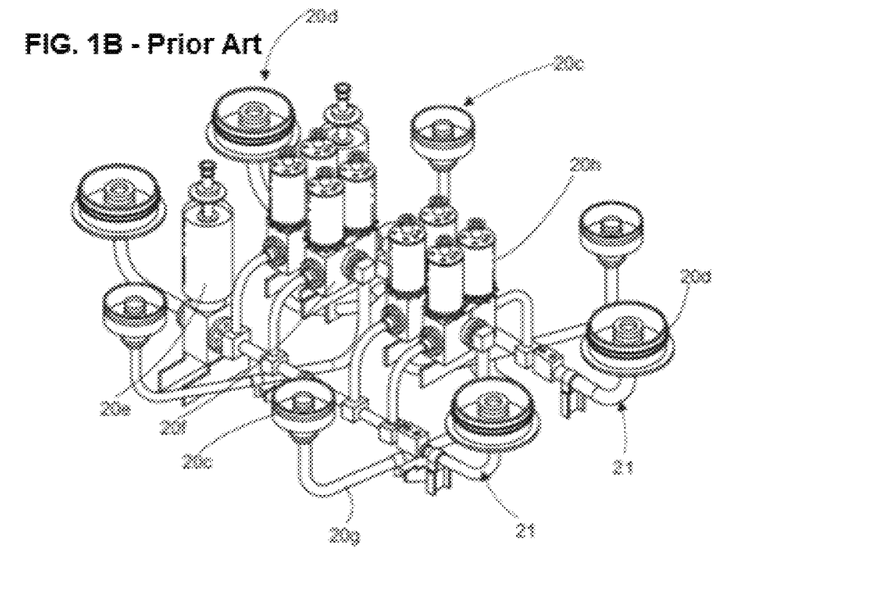

FIG. 1a is an example of a traditional subsea manifold 20, while FIG. 1b is view of the subsea manifold (20) with various structural members omitted so as to better show the various flow lines, valves and manifolds that are part of a typical subsea manifold (20). As shown in FIG. 1a, the subsea manifold (20) is comprised of a main base (20a) and arrangement of structural members (20b). As noted above, the combination of the main base (20a) and arrangement of structural members (20b) are designed to support the arrangement of the pipes and other equipment or components of the subsea manifold (20). More specifically, the external structure of the manifold provides a space frame that is used for a variety of purposes: 1) to facilitate the lifting and installation of the manifold 2) to protect the valves and pressure piping from dropped objects, 3) to provide structural support for the connection piping between the tree—manifold and the manifold—export piping and 4) to support piping loads whether induced by weight, thermal or vibration, i.e., to absorb substantially all piping loads. With reference to FIG. 1b, the illustrative subsea manifold (20) is designed for receiving fluid from 4 oil wells and it has two headers (21) that are adapted to be coupled to two flow lines. More specifically, the subsea manifold (20) is comprised of four vertically oriented connections (20c) (where flow from each of the oil wells will be received) and four vertically oriented hubs (20d) on the headers (21) (for providing input and output connections to two flow lines (not shown) that provide fluid to/from the manifold (20), The manifold (20) also includes eight illustrative inlet flow valves (20h) (that direct the flow of fluid received from the wells) and two illustrative header valves (20e) to control the flow of fluid within the headers (21). The eight inlet flow valves are positioned in four separate valve bodies (20f) (valve blocks are sometimes used in lieu of valve bodies), ten illustrative valves/valve actuators and various piping arrangements and loops (20g) comprised of welded pipe sections, fittings and flanges. Additionally, from time to time, various operations are performed to clean out the interior of the various piping loops. e.g., a full diameter pig is forced through the piping system. A pig can also be used for inspection of the pipe and other maintenance and inspection operations. Accordingly, the pipe loops and elbows must be sized large enough such that such pigging devices may readily pass through all of the "turns" within the piping system, i.e., the turns within the piping system must have a large enough radius so as to insure that such cleaning devices may readily pass through the turn in the piping system.

In the depicted example, ignoring the main base (20a) and arrangement of structural members (20b), the subsea manifold (20) is comprised of twenty four connections, eighteen spool pieces, which require fifty welding processes, six separate valve blocks and eight hubs (20c), (20d). The key point is that, irrespective of exact numbers (which will change depending upon each application), a typical or traditional manifold requires numerous individual components, and it requires that numerous welding procedures and inspection procedures be performed to manufacture such a traditional manifold. In the depicted example, the subsea manifold (20), including the main base (20a) and arrangement of structural members (20b), has an overall weight of about 90 tons—about 33 tons of which are comprised of pressure retaining pipe and equipment and about 57 tons of which are comprised of various structural members (20b) and the main base (20a) More specifically, a typical prior art subsea manifold may have an overall length of about 8 meters, an overall width of about 7 meters and an overall height of about 7 meters. Thus, in this example, the traditional subsea manifold (20) has a "footprint" of about 56 m$^2$ on the sea floor and occupies about 392 m$^3$ of space. Of course, these dimensions are but examples as the size and weight of such subsea manifolds (20) may vary depending upon the particular application. But the point is, traditional subsea manifolds (20) are very large and heavy and represent a complex arrangement of piping bends and valves to direct the flow of fluid received from the wells as required for the particular project.

The above noted problems with respect to the weight and dimensions of traditional subsea manifolds (20) is only expected in increase in the future due to the increasing number of valves along with Increases in working pressure and subsea depth, resulting in increased weight and dimensions for future subsea manifolds (20). In short, a traditional subsea manifold (20) is a structure that has a large size and weight that is comprised of many parts: pipes, bends, fittings, and hubs, and involves performing numerous welding operations to fabricate, all of which hinder the process of fabrication, transportation and installation. Installation of a subsea manifold is a very expensive and complex task. The manifold must be lifted and installed using cranes designed for the dynamic conditions created by wave, wind and current conditions offshore. The weight of the manifold combined with the dynamic sea conditions requires large installation vessels that are very expensive to operate. Lifting a manifold typically will require an offshore crane with a lifting capacity that is 2× or 2.5× the weight of the manifold due to the dynamic loading and dynamic amplification that results from motion induced by the sea conditions.

The present application is directed to an improved manifold with an unique block architecture that may eliminate or at least minimize some of the problems noted above with respect to traditional subsea manifolds.

BRIEF DESCRIPTION OF THE INVENTION

The following presents a simplified summary of the invention in order to provide a basic understanding of some aspects of the invention. This summary is not an exhaustive overview of the invention. It is not intended to identify key or critical elements of the invention or to delineate the scope of the invention. Its sole purpose is to present some concepts in a simplified form as a prelude to the more detailed description that is discussed later.

Disclosed herein is an improved manifold with an unique block architecture for receiving fluid flow from a plurality of external flow lines, wherein each of the external flow lines is connected to a respective one of a plurality of sources of fluid to be provided to the improved manifold with an unique block architecture. In one illustrative embodiment, the manifold is comprised of a block with at least one drilled header hole formed within the block, a plurality of drilled flow inlet holes formed within the block, wherein the number of drilled flow inlet holes corresponds to the number of the plurality external flow lines, and wherein the drilled flow inlet holes are in fluid communication with the at least one header via at least one other drilled hole formed within in the block, and a plurality of isolation valves coupled to the block wherein the valve element for each of the isolation valves is positioned within the block.

BRIEF DESCRIPTION OF THE DRAWINGS

The present invention will be described with the described drawings, which represent a schematic but not limiting its scope.

While the subject matter disclosed herein is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF THE INVENTION

Various illustrative embodiments of the invention are described below. In the interest of clarity, not all features of an actual implementation are described in this specification. It will of course be appreciated that in the development of any such actual embodiment, numerous implementation-specific decisions must be made to achieve the developers, specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The present subject matter will now be described with reference to the attached figures. Various structures and devices are schematically depicted in the drawings for purposes of explanation only and so as to not obscure the present disclosure with details that are well known to those skilled in the art. Nevertheless, the attached drawings are included to describe and explain illustrative examples of the present disclosure. The words and phrases used herein should be understood and interpreted to have a meaning consistent with the understanding of those words and phrases by those skilled in the relevant art. No special definition of a term or phrase, i.e., a definition that is different from the ordinary and customary meaning as understood by those skilled in the art, is intended to be implied by consistent usage of the term or phrase herein. To the extent that a term or phrase is intended to have a special meaning, i.e., a meaning other than that understood by skilled artisans, such a special definition will be expressly set forth in the specification in a definitional manner that directly and unequivocally provides the special definition for the term or phrase.

Figure 5:
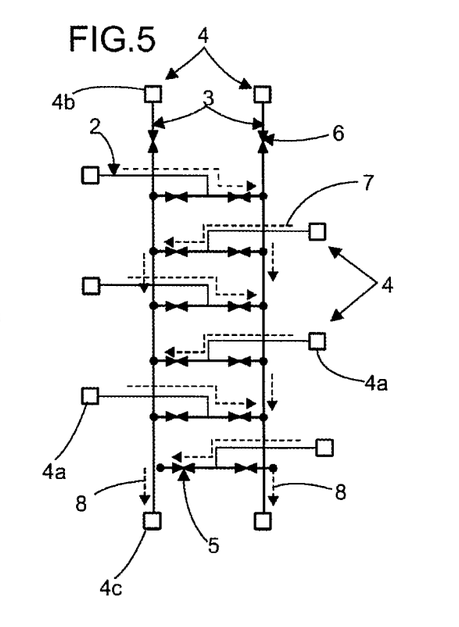
FIG. 5 is a flowchart that schematically shows the parts of one illustrative example of an unique block architecture for a manifold as disclosed herein that is designed for 6 wells.
Figure 5A:
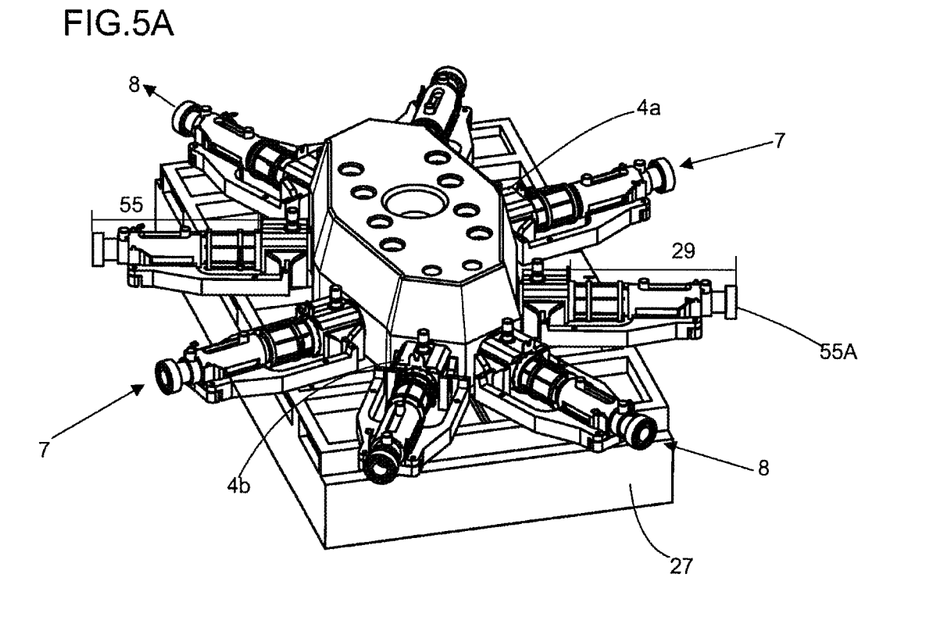
FIG. 5A is a perspective view showing various aspects of one illustrative embodiment of a manifold disclosed herein.

According to the figures, it is observed that the manifold (10) disclosed herein comprises a block (1) that is positioned on a base (27) (see FIG. 5A). In the depicted example, the manifold generally includes a block (1), a plurality of hubs (4) (flow inlet hubs 4a, header inlet hubs 4b and header outlet hubs 4c), a plurality of isolation valves (5), (6) and a cover (11). Of course, depending upon the particular application and any customer specific requirements, the number of isolation valves may vary in one or more of the lines. For example, instead of two flow isolation valves to direct the flow of a fluid received in a particular line, a third isolation valve may be provided in the network so as to provide an additional pressure barrier during well operations. Thus, the particular number of valves and their particular placements depicted herein are but examples and should not be considered to be a limitation of the presently disclosed inventions.

Figure 4:
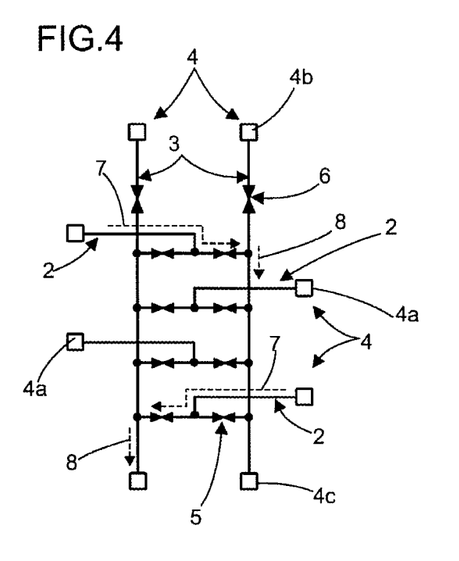
FIG. 4 is a flowchart that schematically shows the parts of one illustrative example of an unique block architecture for a manifold as disclosed herein that is designed for 4 wells.

The block (1) is provided with drilled or machined holes "wells lines" (2) wherein the number of inlet holes (2) corresponds to the number of wells and/or desired manifolds that provide fluid flow to the manifold (10) via various flow lines (not shown). The holes (2) are responsible for the fluid flow (7) (shown schematically in FIGS. 4 and 5) that comes from the wells (originating from the Christmas trees) and/or other manifolds to the manifold (10) via flow inlet hubs (4a). The block (1) is also provided with drilled or machined holes "called headers" (3) that are responsible for directing the flow (8) of fluid to and from the manifold (10) via flow lines (not shown) that are coupled to the header inlet hubs (4b) and header outlet hubs (4c) thereby providing the connection between the manifold (10) and other manifolds or components. The illustrative manifold (10) depicted in FIGS. 6, 6A. 7-7B and 8 also includes eight well flow (inlet fluid) isolation valves (5) and two header flow isolation valves (6) (positioned in line with the headers (3)). The isolation valves (5), (6) may be actuated to open or close a flow line, and they may be used to control and selection of the flow lines within the block (1) that will be used in operation to direct the flow of fluids within the block (1) as required. Two of the well flow isolating valves (5) are used to control the direction and routing of the fluid received from a well (via a particular inlet hole (2)) within the block (1). That is, by opening one of the well flow isolation valves (5) and closing the other well flow isolation valves (5) associated with a particular inlet hole (2), the direction of the flow that comes from the wells may be directed as desired within the block (1). The header isolation valves (6) may be used to block, allow or throttle flow within the headers (3). The manifold (10) is provided with a cover (protection) (11) fastened to the hubs (4) and valves (5) and (6).

The block (1) also comprises a plurality of machined holes or intersections (9) (crossover lines) that may be used to route fluid from the inlet holes (2) to the headers (3) via the actuation of one or more of the valves (5). That is, the machined/drilled holes (2) and (3) in the block (1) in combination with the intersections (9) constitute a network of machined/drilled holes that provide for the routing of the fluid stream within the block (1). The drilled holes may be straight or may have a curvature. Thus, the flow of the fluids originating in production wells will go through the holes (2), the intersections (9) and holes (3). This characteristic is extremely relevant to the manifold (10) disclosed herein. That is, by forming this network of machined holes within the block (1), the need for the design and manufacture of piping (see (20 g) in FIG. 1b) and most if not all of the metal supporting structure (20 b) and the welding of the pipe elements (20 g) commonly used/performed in a conventional manifold may be omitted.

In some embodiments, the manifold may include a drilled hole that provides a positioning for a choke element, a single phase meter, a multiphase meter, and/or other element interacting with a flow through the manifold. In some embodiments, the manifold may include a drilled hole in the form of a choke element.

Illustrative Embodiment for 4 Wells

From FIGS. 2, 3, 4 and 6 shows the architecture of a block (1) according to one illustrative embodiment disclosed herein. In this particular example, the block (1) is provided with four holes "called wells lines" (2). The holes (2) are responsible for receiving the flow of fluid (7) that comes from wells (originating from the Christmas trees) and/or another manifold. The block (1) is also comprised of two holes "called headers" (3) that are responsible for directing the flow (8) of fluid to and from the manifold (10) via flow lines (not shown) that are coupled to the header inlet hubs (4b) and the header outlet hubs (4c) thereby providing the connection between the manifold (10) and other subsea manifolds or components. The manifold (10) also includes eight well flow (fluid inlet) isolation valves (5) and two header isolation valves (6) that carry out opening or closing a flow line, being responsible for flow control and selection of the flow lines which will be used in operation. As noted above, two of the well flow isolating valves (5) working one open and the other closed, may be operated so as to select the direction of the flow that comes from the wells takes once it enters the block (1). The header isolation valves (6) may be used to block, allow or throttle flow within the headers (3). As before, in this example, the manifold (10) is equipped with one cover (11) fastened to the block with eight hubs (4) (flow inlet hubs (4a), header inlet hubs (4b); header outlet hubs (4c)) and eight well inlet flow valves (5) (12 valves should the customer adopt the 3 valve per branch isolation philosophy) and two header valves (6).

In this particular example the block (1) also comprises four intersections (9) (crossover lines) that may be used to route fluid entering the holes (2) to the headers (3) via the actuation of one or more of the valves (5). Thus, the flow of the fluids originating in production wells will go through the holes (2), the intersections (9) and header holes (3).

Illustrative Embodiment for 6 Wells

FIG. 5 schematic depicts a block (1) according to another illustrative embodiment disclosed herein. In this particular example, the block (1) is provided with six holes "called flow lines" (2). The holes (2) are responsible for receiving the flow of fluid (7) that comes from wells (originating from the Christmas trees) and/or other manifolds. The block (0.1) is also comprised of two holes "called headers" (3), responsible for directing the flow (8) of fluid to and from the manifold (10) via flow lines (not shown) that are coupled to the header inlet hubs (4b) and the header outlet hubs (4c) thereby providing the connection between the manifold (10) and other manifolds or components. The manifold (10) also includes twelve well flow isolation valves (5) and two header isolation valves (6) that carry out opening or closing a flow line, being responsible flow control and selection of the flow lines which will be used in operation. As noted above, two of the well flow isolating valves (5) working one open and the other closed, may be operated so as to select the direction of the flow that comes from the well takes once it enters the block (1). As before, the header isolation valves (6) may be used to block, allow or throttle flow within the headers (3). The manifold (10) is also equipped with one cover (11) fastened to the block with ten hubs (4) (six flow inlet hubs (4a), two header inlet hubs (4b); and two header outlet hubs (4c)), twelve well flow isolation valves (5) (sixteen should the customer adopt the 3 valve per branch philosophy) and two header isolation valves (6).

In this particular example the block (1) also comprises six intersections (9) (crossover lines) that may be used to route fluid from the holes (2) to the headers (3) via the actuation of one or more of the valves (5). Thus, the flow of the fluids originating in production wells will go through the holes (2), the intersections (9) and header holes (3).

Of course, as will be appreciated by those skilled in the art after a complete reading of the present application, the novel manifold comprises provides a very flexible approach that may be extended beyond the illustrative examples depicted herein without departing from the scope of the inventions disclosed herein. For example, in some applications, it may be required to design a manifold that accommodates more than six Christmas trees (wells) connected to the manifold (10). In such instances, it is envisioned that multiple blocks (1) will be required to accommodate all of the isolation valves (5) (and/or valves (6)). More specifically, in one example it is contemplated that multiple blocks (e.g., multiple versions of the block (1a)) may be connected together to accommodate all of the isolation valves in the manifold (10). Such multiple blocks (1a) may be operatively coupled together using any of a variety of fastening mechanisms. e.g., such as bolts or other means securing one block (1a) to an adjacent block (1a). Of course, the illustrative caps (1b), (1c) may or may not be employed in such an application. In the case where multiple blocks (like the blocks (1a) are employed) the headers (3) will be aligned to insure unobstructed flow of fluid or pigs, etc. through the combined assembly of the blocks (1a). A seal will be provided between the block (1a) to insure pressure tight integrity between the interfaces between the blocks (1a) at each header (3).

Effects and Benefits

As will be appreciated by those skilled in the art after a complete reading of the present application, the novel manifold comprises all of the isolation valves need to control fluid flow within for the manifold are positioned in the block (1), i.e., the valve element for each of the isolation valves is positioned within that block. The block also includes a network of drilled or machined holes (2), (3) within block. The isolation valves (5) may be selectively actuated so as to control and direct the flow of fluid from oil wells within the block (1) to the headers (3). These characteristics, above described, give the novel manifold disclosed herein at least some of the following advantages relative to traditional subsea manifolds:

1. the manufacture of the manifold disclosed herein is faster and simpler;
2. the manifold disclosed herein has a reduced overall weight and size;
3. simplifies and reduces the logistics and transportation of the manifold;
4. reduces numbers of parts of the manifold (e.g., connections, spool pieces, pipes);
5. reduces the need for welding;
6. promotes standardization of the production line of the manifold.

The following is a table making a simple comparison of one embodiment of the manifold disclosed herein relative to a conventional subsea manifold (Table 1):

|                   |               | Conventional Design | New Design |
|-------------------|---------------|---------------------|------------|
| Hubs for 4 wells  | Connections   | 24                  | 0          |
| 4 hubs            | Spools        | 18                  | 0          |
| 10 valves         | Welding       | 50                  | 0          |
|                   | Valves blocks | 6                   | 2          |
|                   | Hubs          | 8                   | 8          |
|                   | Weight        | 57 tons             | 25 tons    |

As noted above, the manifold disclosed herein substantially reduces the complexity of production, assembly, transport, installation and operation of a manifold. The manifold disclosed herein may be produced in any material as is appropriate for the application. The material should be resistant to temperature, pressure and corrosive environment, when dedicated to subsea applications.

With continuing reference to the drawings, in the depicted example, the number and the diameter of the holes (2) and (3) and the intersections (9) (crossovers) may vary depending upon the particular applications. In the illustrative example depicted herein, the manifold (10) is comprised of two headers (3). However, in some applications, the manifold (10) may contain only a single header (3), or it may contain several headers (3) (e.g., the manifold (10) may contain three headers (3) wherein one of the headers is used for well testing). Thus, the number of headers (3) and openings (2) should not be considered to be a limitation of the presently disclosed inventions. Typically, the headers (3) may have a larger diameter than the holes (2), and/or intersections (9), although such a configuration may not be required in all applications. In one particular example, the headers (3) may have a diameter of about 250 mm, while the holes (2) and intersections (9) may have a diameter of about 130 mm. However, in other applications, the headers (3) and holes (2) may have the same diameter.

The isolations valves (5), (6) disclosed herein may be any type of valve, e.g., a gate valve, a ball valve, etc. that is useful for controlling the fluid flow as described herein. The valves (5), (6) are mounted to the block (1) by a flanged connection, and they are mounted such that their valve element, e.g., a gate or a ball, is positioned within the block (0.1). In the depicted example, the valves (5), (6) do not have their own individual actuators, i.e., they are mechanically actuated valves that may be actuated by other means, such as an ROV, or each of the valves (5), (6) may be provided with their own individual actuator (hydraulic or electric) while still achieving significant benefits via use of the unique block architecture disclosed herein.

With reference to FIGS. 6, 6A, 7, and 7A, in the depicted example, the block (1) is comprised of a three components: a generally rectangular shaped body (1a), an inlet end cap (1b) and an outlet end cap (1c). The end caps (1b), (1c) may be coupled to the body (1a) by a plurality of bolts but other fastening methods are possible i.e. a clamp. The body (1a) is a continuous block of material (i.e., a steel forging) that has all of the holed (2), (3), (9) drilled or machined into the block of material. FIG. 7B is a perspective view of one illustrative example of the body portion (1a) of the block (1). As shown, the holes (2), (3) are drilled in the body (1a) along with holes (5a) for receiving the valve element (not shown) of the isolation valves (5). In terms of manufacturing the block (1), in some cases, openings (13a) (see FIG. 7B) may be formed in the body portion (1a) of the block (1) so as to facilitate machining of the various holes (2), (3), and (9) or a part of forming the holes themselves. Some of these openings (13a) may eventually be blinded with a metal blind (13) in the final manifold (see FIGS. 2, 3, 6 and 7). The end caps (1b), (1c) may be bolted to the ends (1y), (1z), respectively, of the body portion (1a) of the block (1). In the depicted example, the end caps (1b), (1c) are provided with angled outer surfaces (1x) (see FIGS. 6 and 6A) that are angled with respect to the centerline of the header holes (3) that extend through the body portion (1a) of the block (1). However, it is possible that the holes will not be angled in every configuration. For example a single header design will not require the holes to be angled. FIGS. 7C and 7D are top and side views, respectively, of an embodiment of the block (1) that comprised twelve isolation valves (5). As depicted a plurality of holes (5a) and (6a) are formed in the block (1) for the valves (5), (6). Also depicted in these two drawings are one example of the routing of the drilled holes (2), (3) and (9) within the block (1) as well as several of the openings (13a) that may be subsequently blinded. Additionally, in some applications the end caps (1b), (1c) may be omitted and the block may be a single block of material with the drilled header holes (3) and the plurality of drilled flow inlet holes (2) formed within the single block of material.

In the example depicted herein, all of the well flow (inlet flow) isolation valves (5) are positioned within the body portion (1a) of the block (1), while the header isolation valves (6) are positioned within the inlet end cap (1b). Importantly, unlike prior art subsea manifolds, all of the isolation valves associated with controlling the flow of fluid to and through the manifold (10) are positioned within a single block (1) (the combination of portions (1a-c)), along with the network of drilled (machined openings (2), (3), (9)) where fluid may flow within the block (1). The isolations valves (5), (6) disclosed herein may be any type of valve, e.g., a gate valve, a ball valve, etc. that is useful for controlling the fluid flow as described herein. In the depicted example, the valves (5), (6) do not have their own individual actuators, i.e., they are mechanically actuated valves that may be actuated by other means, such as an ROV, or each may be provided with their own individual actuator. In one example, the block (1) (the combination of portions (1a-c)) disclosed herein has an overall length of about 2.5 meters, an overall width of about 1.5 meters and an overall height of about 1 meter.

Figure 2:
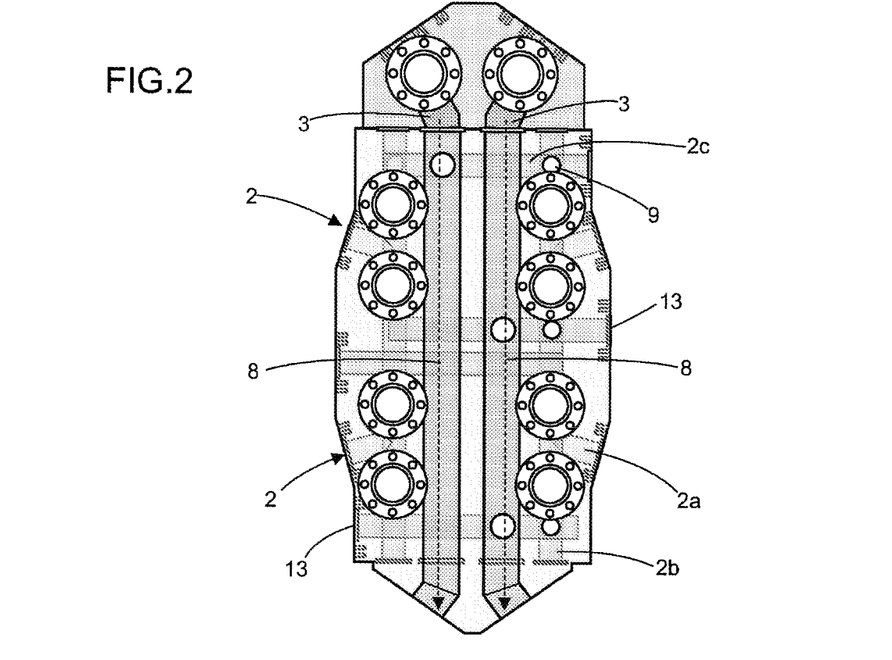
FIG. 2 is an illustrative internal view of one illustrative example of an unique block architecture for a manifold as disclosed herein that is designed for 4 wells, wells lines, headers and flow lines in the headers.
Figure 3:
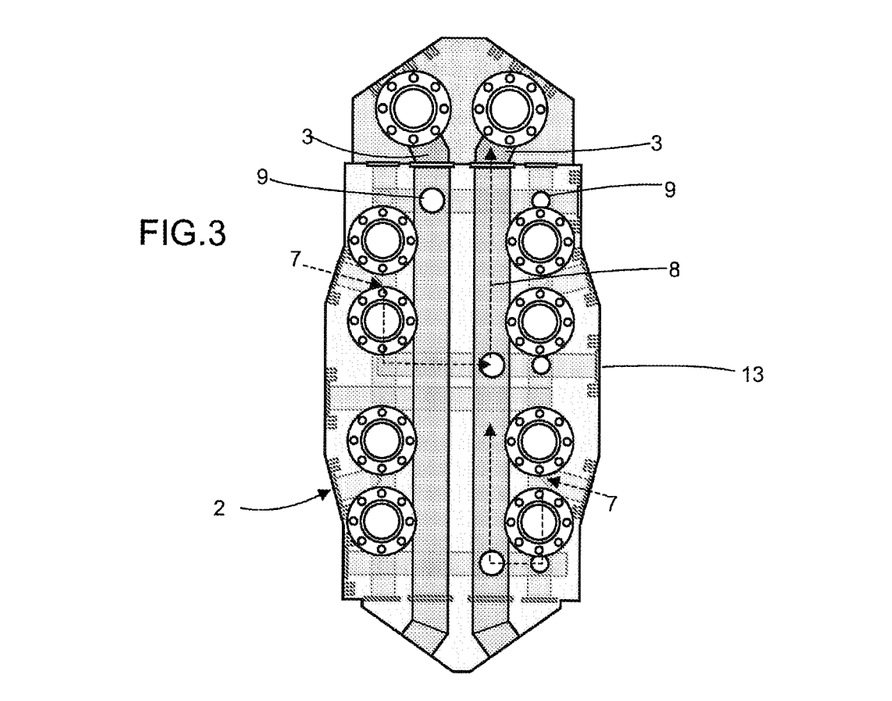
FIG. 3 is another illustrative internal view of one illustrative example of an unique block architecture for a manifold as disclosed herein that is designed for 4 wells, wells flow lines, headers and flow lines in the headers.
Figure 7:
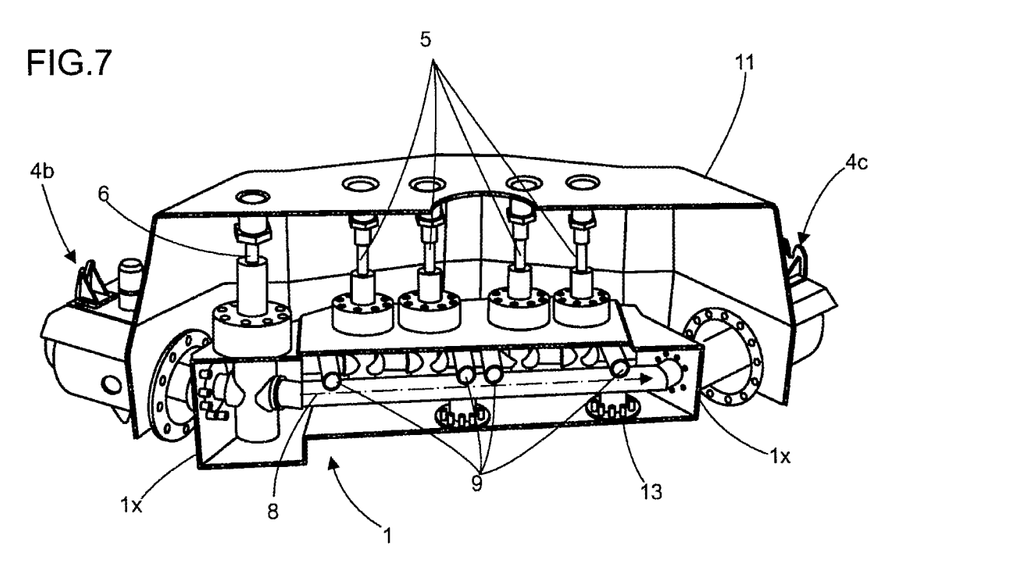
FIG. 7 is a cross-sectional view of one illustrative example of an unique block architecture disclosed herein and flow lines in one of the headers.
Figure 7A:
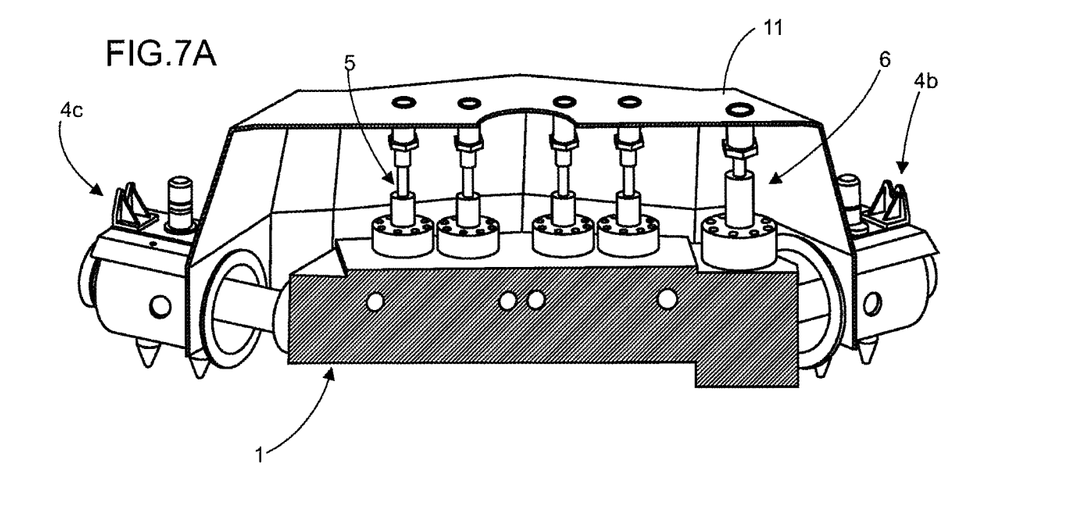
FIG. 7A is another cross-sectional view of one illustrative example of an unique block architecture disclosed herein.

With reference to FIG. 2, in the depicted example, the drilled holes (2) are comprised of an initial portion (2a), a portion (2b) that constitutes an inlet flow sub-header (2b) and a portion (2c) that constitutes the intersection (9) (crossover). The inlet flow sub-header portions (2b) of the holes (2) are positioned approximately parallel to the headers (3). The inlet portion (2a) of the holes (2) are in fluid communication with the inlet sub-header (2b). The well flow isolation valves (5) are positioned in-line in the inlet sub-headers (2b) so as to direct flow received via the holes (2). The inlet sub-headers (2b) are also in fluid communication with the intersections (9) (crossovers) and ultimately the headers (3). FIG. 7A is a cross-sectional view taken though the block (1) showing the initial portion (2a) of the holes (2).

Figure 6:
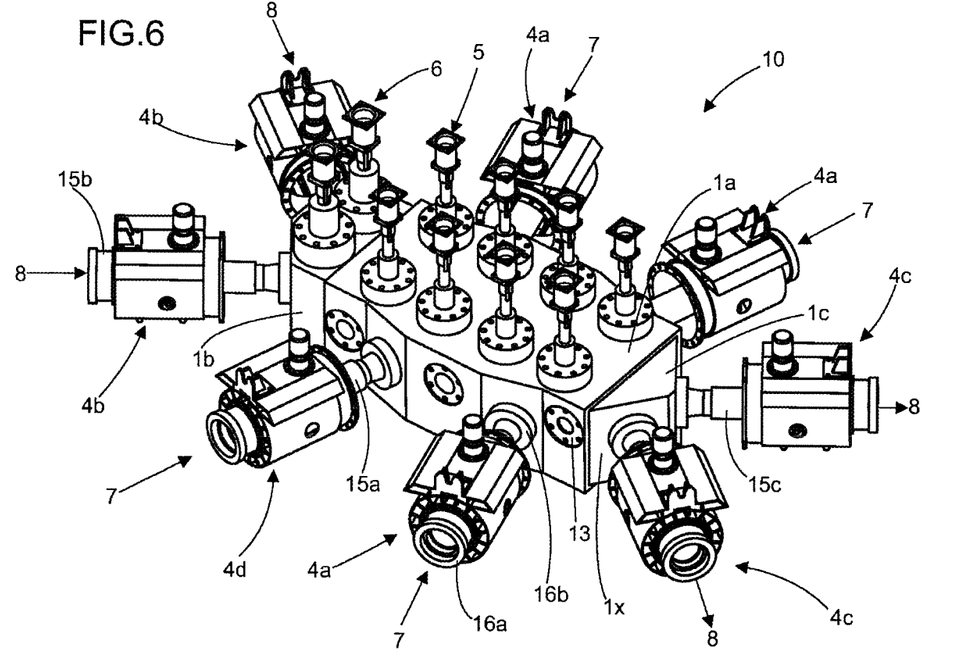
FIGS. 6 and 6A are perspective views showing various aspects of one illustrative embodiment of a manifold disclosed herein, particularly, a unique block architecture with valves, hubs, and the block for the manifold as described herein.
Figure 7B:
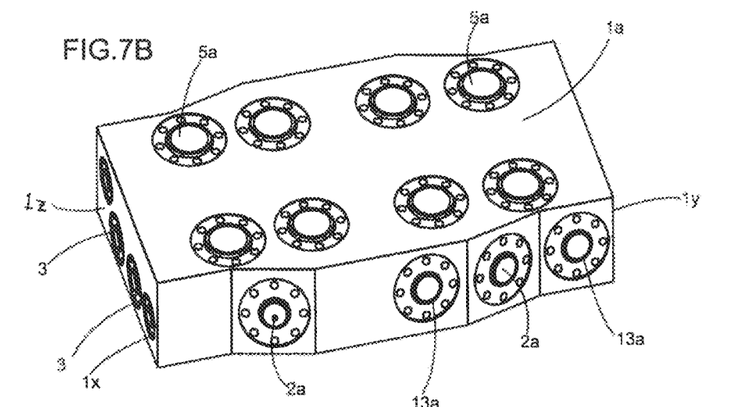
FIG. 7B is a perspective view of one illustrative example of a portion of an unique block architecture disclosed herein.
Figure 7C:
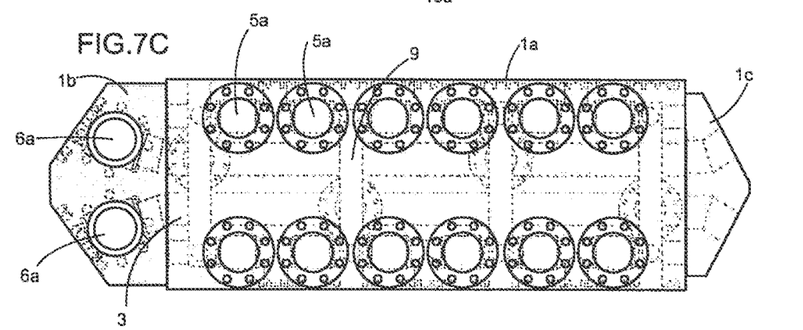
FIG. 7C is a plan view of one illustrative example of an unique block architecture disclosed herein showing various internal drill holes within the block.
Figure 7D:
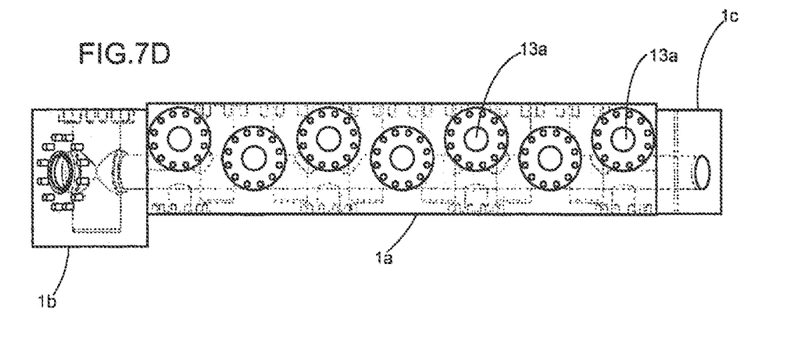
FIG. 7D is a side view of one illustrative example of an unique block architecture disclosed herein showing various internal drill holes within the block.
Figure 8:
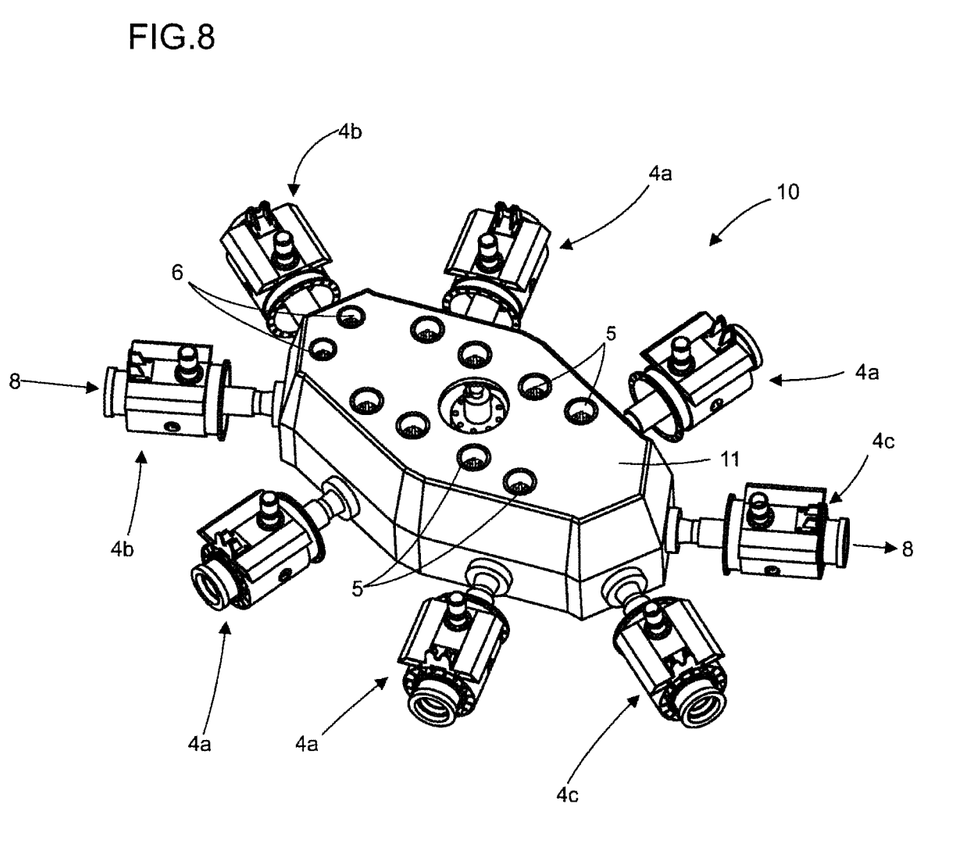
FIG. 8 is another perspective view showing various aspects of one illustrative embodiment of a manifold disclosed herein.

With reference to FIGS. 5A and 6, the manifold (10) is comprised of four straight in-flow horizontal connector systems (55) that terminate with an outermost hub that is adapted to be coupled to a connector (not shown) on a flow line (not shown) that provides fluid flow into the manifold (10). In the depicted example, each of the in-flow horizontal connector systems (55) is comprised of a spool or conduit (15a) (see FIG. 6) and a horizontal connector (29) (see FIG. 5A) that is coupled to the spool (15A). Each of the in-flow horizontal connector systems (55) provide a straight, turn-free flow path between the outlet hub of a flow line (not shown) connected to a well to the inlet of a hole (2) in the block (1)—the block that houses the isolation valves (5). In the depicted example, four similar horizontal connector systems (55) are provided for the inlet and outlet of the headers (3). More specifically, the header connector systems are comprised of four spools or conduits ((15b)—inlet; (15c)—outlet) and associated horizontal connectors (29). The header horizontal connector systems provide straight, turn-free flow paths between the hubs of the flow lines (not shown) providing fluid to, and receiving fluid from, the headers (3). As shown in FIG. 6, the illustrative spools or conduits (15a-c) are comprised of an inlet hub (16a) and an interfacing hub (16b). In the depicted example, the inlet hub (16a) interfaces with a hub of a horizontal connector (29), while the interfacing hub (16b) is directly coupled to the block (1) ((1a), (1b) or (1c) depending upon the connection at issue) via a flanged/bolted connection. The angled surfaces 1x of the end caps (1b), (1c) are provided such that the centerline of the spools or conduits (4b), (4c) may be angled away from one another (or diverge from one another) thereby providing a more compact design of the overall subsea manifold. Of course, in some applications, the end caps (1b), (1c) may be omitted and the spools or conduits (15b), (15c) may be directly coupled to the ends of the generally rectangular shaped body (1a).

Figure 9:
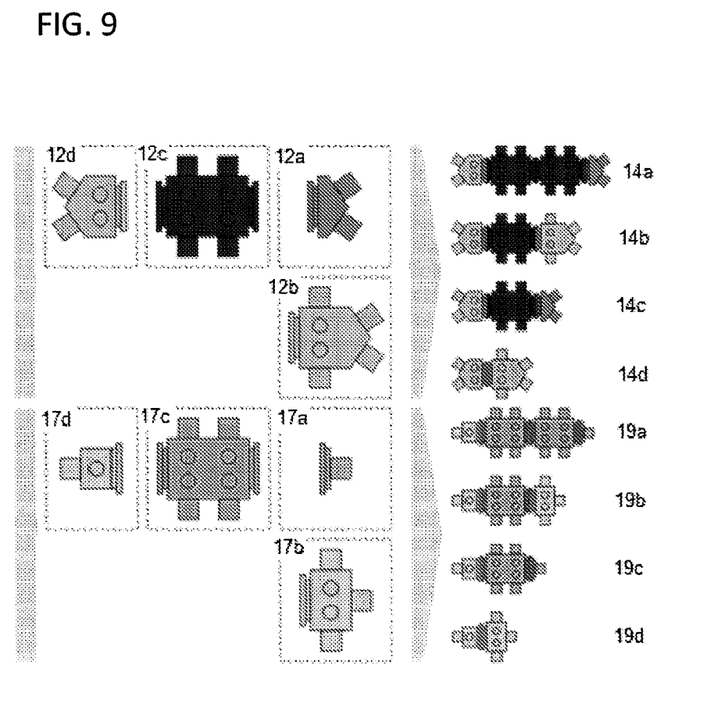
FIG. 9 is a plan view showing various smaller alternative configurations of the block disclosed herein and illustrative examples of blocks and end caps according to said smaller alternative configurations of the block disclosed herein.

With reference to FIG. 9, the smaller alternative configuration of the block (14a) is comprised of four components: two rectangular shaped body (12c), one end cap (12a) and one end cap (12d); the smaller alternative configuration of the block (14b) is comprised of three components: one rectangular shaped body (12c) one end cap (12b) and one end cap (12d); the smaller alternative configuration of the block (14c) is comprised of three components: one rectangular shaped body (12c), one end cap (12a) and one end cap (12d); the smaller alternative configuration of the block (14d) is comprised of two components: one end cap (12b) and one end cap (12d); the smaller alternative configuration of the block (19a) is comprised of four components: two rectangular shaped body (17c), one end cap (17a) and one end cap (17d); the smaller alternative configuration of the block (19b) is comprised of three components: one rectangular shaped body (17c), one end cap (17b) and one end cap (17d); the smaller alternative configuration of the block (19c) is comprised of three components: one rectangular shaped body (17c), one end cap (17a) and one end cap (17d); and the smaller alternative configuration of the block (19d) is comprised of two components: one end cap (17b) and one end cap (17*d*). The end caps may be coupled to the body by a plurality of bolts but other fastening methods are possible i.e. a clamp.

Figure 6A:
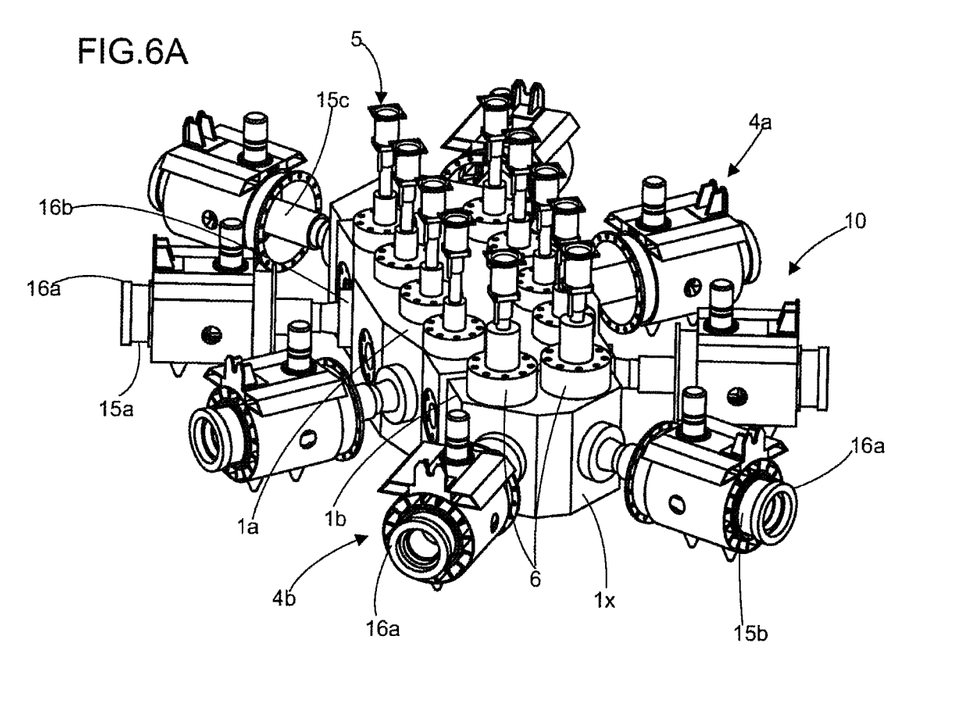

Note that unlike prior art subsea manifolds, using the novel manifold disclosed herein, the horizontal flow path between mating connector of an external flow line, e.g., from a well or other manifold into the holes (2) to the block (1) that contains the isolation valves (5) is a straight, turn-free flow path without any bends. With reference to FIGS. 6 and 6A, one end (16*b*) of the horizontal connector systems (55) is coupled to the block (1) while the other end (55A) of the horizontal connector systems (55) can be coupled to mating connector on a connecting flow line. That is, unlike prior art designs, the flow path between the outlet of a connecting flow line and the block (1) that houses the isolation valves is a straight opening having a uniform internal diameter and internal flow path with no bends or turns. Such a "straight line" configuration between the hub of the external flow lines and the inlet/outlet to the block (1) facilitates clean out operations and results in a reduction in the overall size and weight of the subsea manifold since piping spools with turns formed therein may be omitted with some embodiments of the presently disclosed manifolds. In the depicted example, the spools or conduits (15*a*-*c*) may be a component that is machined from a forging or it may be a manufactured component that is comprised of a straight section of pipe with welded flanges on opposing ends. In general, providing such straight turn-free flow paths is more desirable in that it is more efficient and avoids problems that may be associated with fluid flow in non-straight flow paths, such as eddy currents, erosion, etc. Moreover, the horizontal connector systems in the depicted example aids in reducing the overall size of the manifold. More specifically, by using the horizontal connector (29), the connection between the outermost hub (55A) of the in-flow horizontal connector systems (55) a flow line from a well (and/or other manifolds) can be established remotely. The use of such horizontal connector systems (55) allows lines to be preinstalled (parked) prior to manifold installation. Parking of the flow lines also allows the manifold to be recovered while leaving the flow lines in place. Use of such horizontal connector systems (55) also facilitate a reduction in the amount of structural steel used on the manifold.

As described above, the holes/openings (2), (3) and the intersections (9) (crossovers) are straight constant-diameter holes that are machined (drilled) into the block (1) (1*a*-1*c*). Of course, as noted above, the diameter of the holes (2), (3) and the intersections (9) may be different from one another. These holes are sized so as to provide sufficient diameter for the passage of cleaning devices, such as pigs, through one or more of the flow paths defined in the block (1). Thus, the flow of the fluids originating in production oil wells will readily pass through the holes (2), the intersections (9) and headers (3), i.e., the network of holes within the block (1).

Additionally, using the novel block (1) disclosed herein, substantially all of the piping loads associated with coupling the spools or conduits (15*a*-*c*) to the various flow lines that are coupled to the manifold are absorbed by the block (1). That is, using the novel manifold and block (1) depicted herein, all or significant portions of the arrangement of structural members (20*b*) (See FIG. 1*a*) associated with traditional subsea manifolds may be omitted. Such an arrangement provides for significant reductions in the overall size and weight of the novel subsea manifold disclosed herein as compared to traditional subsea manifolds as described in the background section of this application.

Additionally, relative to the prior art subsea manifold depicted in FIGS. 1*a*-1*b*, the manifold disclosed herein may provide significant reductions in size and weight. For example, relative to the subsea manifold depicted in FIGS. 1*a*-*b*, the novel manifold depicted in FIG. 6-8 has an overall weight of about 45 tons, e.g., about 50% less than the 90 tons for a comparable prior art subsea manifold described in the background section of this application. More specifically, the weight of the pressure containing components of the novel compact manifold disclosed herein may be about 20 tons (as compared to about 37 tons for the prior art subsea manifold) while the weight of various structural members and the base may be about 25 tons (as compared to about 57 tons for the prior art subsea manifold). Additionally, the novel manifold disclosed herein, has a "footprint" of about 22 $m^2$ on the sea floor and occupies about 66 $m^3$ of space, which is much smaller than the comparable prior art subsea manifold described in the background section of this application.

As will be appreciated by those skilled in the art after a complete reading of the present application, the novel manifold (10) disclosed herein provides several advantages in terms of manufacturing as compared to traditional manifolds, such as those described in the background section of this application. More specifically, the manufacturing process for a traditional manifold involves delivering various components, valves, pipe, fittings, tees, hubs and structural steel, etc., to a fabrication yard where the manifold is fabricated where welding is used as the primary method of joining the components together. Welding is a critical process and requires extensive prequalification of welding processes and welding personnel and inspection methods such as ultrasonic and x-ray inspections. In contrast, the novel manifold disclosed herein eliminates many of these components by drilling various openings in the block of the manifold using proven machining operations that are performed for other equipment, such as subsea Christmas tree blocks. Moreover, the manufacture of the novel manifold disclosed herein may be performed within a controlled manufacturing environment, i.e., a sophisticated machining shop, as opposed to a fabrication yard. Additionally, relative to manufacturing a traditional manifold, manufacturing the novel manifold disclosed herein involves a considerable reduction in welding operations which translates into a reduced reliance on welding, inspection and testing.

The particular embodiments disclosed above are illustrative only, as the invention may be modified and practiced in different but equivalent manners apparent to those skilled in the art having the benefit of the teachings herein. For example, the process steps set forth above may be performed in a different order. Furthermore, no limitations are intended to the details of construction or design herein shown, other than as described in the claims below. It is therefore evident that the particular embodiments disclosed above may be altered or modified and all such variations are considered within the scope and spirit of the invention. Note that the use of terms, such as "first," "second," "third" or "fourth" to describe various processes or structures in this specification and in the attached claims is only used as a shorthand reference to such steps/structures and does not necessarily imply that such steps/structures are performed/formed in that ordered sequence. Of course, depending upon the exact claim language, an ordered sequence of such processes may or may not be required. Accordingly, the protection sought herein is as set forth in the claims below.

The invention claimed is:

1. A manifold for collecting and/or distributing fluid flows from or to a plurality of external flow lines, the manifold comprising:
a block constructed of a single piece of material;
at least one drilled header hole formed within and extending through the block from a first end of the block to a second end of the block thereby providing a straight fluid flow path through the block from the first end to the second end;
at least one drilled flow inlet hole formed within and extending through the block, the drilled flow inlet hole being in fluid communication with the at least one drilled header hole;
a plurality of isolation valves coupled to the block, wherein a valve element of at least one of the isolation valves is positioned within the block within the at least one drilled flow inlet hole,
wherein the plurality of isolation valves comprises a header isolation valve, the header isolation valve positioned in line with the at least one drilled header hole proximate an inlet end of the block to block, allow, or throttle flow within the at least one drilled header hole, and a flow isolation valve coupled to the block so as to direct fluid flow received into the at least one drilled flow inlet hole to the at least one header hole; and
a fluid path connecting the at least one drilled header hole to the at least one drilled flow inlet hole, wherein the fluid path is provided at least partly by at least one crossing of the at least one drilled header hole and the at least one drilled inlet hole, and thereby, a connection of the at least one drilled header hole and the at least one drilled flow inlet hole in the block, and the at least one crossing of the at least one drilled header hole and the at least one drilled inlet hole is off center, such that a center line of the at least one drilled header hole in the crossing is at a distance from a center line of at least one second drilled header hole in the crossing.

2. The manifold of claim 1, wherein there are a plurality of drilled flow inlet holes.

3. The manifold of claim 1, wherein the manifold comprises at least one additional drilled hole formed within the block, to connect the at least one drilled header hole with the at least one drilled inlet hole.

4. The manifold of claim 1, further comprising an inlet cap portion and/or an outlet cap portion disposed on the block.

5. The manifold of claim 1, further comprising a plurality of connector systems, each of which defines an internal flow path within the connector system, each connector system having a first end that is coupled to the block and in fluid communication with one of the at least one drilled flow inlet hole and a second end that has a hub that is adapted to be coupled to a hub of an external flow line.

6. The manifold of claim 5, wherein the connector systems provided are arranged with an extension from the first end to the second end extending horizontally, vertically, and/or at an angle with the connectors.

7. The manifold of claim 5, wherein the connector system is provided with a straight flow path between the first end and the second end.

8. The manifold of claim 1, wherein the at least one header hole has a first diameter and the at least one drilled flow inlet hole has a second diameter, the first diameter being greater than the second diameter.

9. The manifold of claim 1, wherein the at least one header hole has a first diameter and the at least one drilled flow inlet hole has a second diameter, wherein the first diameter and the second diameter are equal.

10. The manifold of claim 1, wherein there are two drilled header holes having different diameters, and/or wherein there are two drilled flow inlet holes having different diameters.

11. The manifold of claim 1, wherein sources of fluid are provided to the manifold and comprise a plurality of oil/gas wells or another manifold.

12. The manifold of claim 1, wherein the isolation valves are gate valves.

13. The manifold of claim 1, wherein the at least one drilled header hole comprises a straight constant diameter hole that provides a straight constant diameter flow path extending from the first end of the block to the second end of the block.

14. The manifold according to claim 1, wherein the at least one drilled flow header hole and/or the at least one drilled inlet hole is fused with a blind flange.

15. The manifold according to claim 1, wherein the block comprises a drilled hole that provides a position for a choke element, a single phase meter, or a multiphase meter interacting with a flow through the manifold.

16. The manifold according to claim 1, wherein the block comprises a drilled hole acting as a choke element.

17. The manifold of claim 1, wherein the manifold comprises at least two drilled header holes, at least four drilled flow inlet holes, and wherein the plurality of isolation valves comprises two header isolation valves and eight flow isolation valves, wherein, for each of the at least four drilled flow inlet holes, two of the eight flow isolation valves are coupled to the block so as to direct fluid flow received into the at least four drilled flow inlet holes to at least one of the two drilled header holes.

18. The manifold according to claim 1, wherein the block comprises at least two drilled header holes and at least two drilled flow inlet holes and two flow isolation valves, arranged in the block such that the at least two drilled header holes and the at least two drilled flow inlet holes are all in fluid connection with each other by themselves or through additional drilled holes, and the flow isolation valves are positioned to control and divert the flow in a desired direction.

19. The manifold according to claim 1, wherein the block comprises at least two drilled header holes and at least two drilled flow inlet holes, arranged such that there is provided two separate flow passage systems through the block.

20. The manifold according to claim 1, wherein the manifold comprises at least two drilled flow inlet holes, and the header isolation valve arranged in connection with the at least one drilled header hole and at least two flow isolation valves arranged in connection with the at least two drilled flow inlet holes.

21. The manifold according to claim 1, wherein the manifold comprises at least two drilled header holes and at least two drilled flow inlet holes, and with the plurality of isolation valves arranged in connection with each of the at least two drilled header holes and each of the at least two drilled flow inlet holes.

22. A manifold for collecting and/or distributing fluid flows from or to a plurality of external flow lines, the manifold comprising:
a block constructed of a single piece of material;
at least one drilled header hole formed within and extending through the block from a first end of the block to a second end of the block thereby providing a straight fluid flow path through the block from the first end to the second end;

at least one drilled flow inlet hole formed within and extending through the block, the drilled flow inlet hole being in fluid communication with the at least one drilled header hole;

a plurality of isolation valves coupled to the block, wherein a valve element of at least one of the isolation valves is positioned within the block within the at least one drilled flow inlet hole, wherein the plurality of isolation valves comprises a header isolation valve, the header isolation valve positioned in line with the at least one drilled header hole proximate an inlet end of the block to block, allow, or throttle flow within the at least one drilled header hole, and a flow isolation valve coupled to the block so as to direct fluid flow received into the at least one drilled flow inlet hole to the at least one header hole; and at least one intersection that provides a fluid path connecting the at least one drilled header hole to the at least one drilled flow inlet hole, wherein the at least one drilled header hole is perpendicular to the at least one drilled flow inlet hole and wherein a center line of the header hole is off center from a center line of the at least one drilled flow inlet hole.

23. A manifold for collecting and/or distributing fluid flows from or to a plurality of external flow lines, the manifold comprising:

a continuous rectangular block of a single material, the block comprising a network of holes therein, the network of holes defining at least one header hole formed within and extending through the block from an inlet end to an outlet end of the block, at least one flow inlet hole formed within and extending through the block, and at least one intersection formed within the block and providing a fluid path connecting the at least one header hole and the at least one flow inlet hole; and a plurality of isolation valves coupled to the block, wherein a first valve element of a first isolation valve is positioned within the block within the at least one flow inlet hole and a second valve element of a second isolation valve is positioned within the block within the at least one header hole, wherein the second isolation valve is positioned in line with the at least one header hole proximate an inlet end of the at least one header hole and an inlet end of the block to block, allow, or throttle flow within the at least one header hole, wherein the at least one intersection connects the at least one header hole and the at least one flow inlet hole at a location along the at least one header hole between the second isolation valve and the outlet end of the at least one header hole.

* * * * *